Patented Dec. 19, 1933

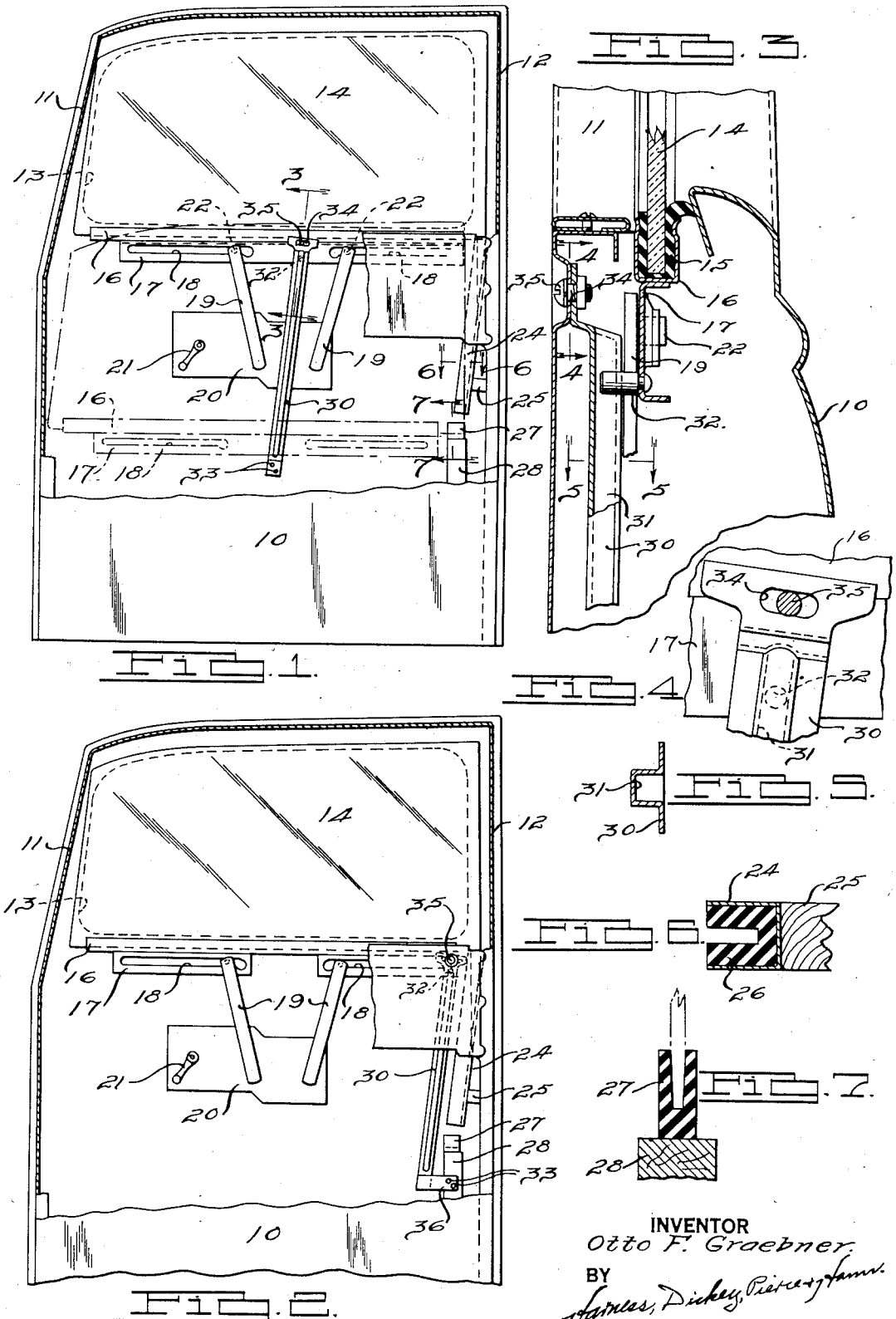

1,939,976

UNITED STATES PATENT OFFICE 1,939,976

VEHICLE BODY WINDOW CONSTRUCTION

Otto F. Graebner, Detroit, Mich., assignor to The Murray Corporation of America, a corporation of Delaware Application June 22, 1931. Serial No. 545,924

17 Claims. (Cl. 296—48)

My invention relates to improvements in vehicle body window construction and more particularly to sliding window construction having inclined side members.

The present trend of automotive vehicle body design employs generally an inclined or rearward slanting front end and windshield. The front body pillars are therefore slanted toward the rear at their upper portion and the forward edges of the front door frame and panel are necessarily slanted at a complementary angle. To provide window openings as large as possible and in harmony with such design they are trapezoidal in shape and are framed at the front edge by the inclined door pillar. The rear portion of the window frame is generally vertical.

Such construction and design presents a problem in the sliding of the windows when raised or lowered. If the windows are moved vertically in the rear glass run channel, the forward inclined edges of the glass will be separated from the forward channel and window frame and the forward inclined edge of the window glass will be exposed. This condition results in looseness of the parts, rattling, uncertainty of action and unsatisfactory protection against the wind when it is desired to have the window in partly opened position, together with other objections to the exposure of the entire front edge of the glass.

My invention is directed toward protecting and concealing at all times both of the end edges of the glass plate and especially the forward edge by sliding the glass in a manner whereby it will always remain covered by the forward and rear side of the window opening frame.

It is an object of my invention to provide an improved means of raising and lowering the glass in an inclined window frame.

Another object of my invention is to provide means for definitely guiding a window glass in inclined movements with respect to the framed opening.

Another object of my invention is to provide improved apparatus for raising and lowering the window glass in a vehicle body window opening of trapezoidal shape in a manner whereby the side edges are at all times covered by the window frame.

A further object of my invention is to provide means for moving a window glass in a frame, one side of which is inclined at an angle to the perpendicular, in a path parallel to the inclined side of the frame.

A further object of my invention is to provide an improved mechanism for imparting up and down movements to a window glass and simultaneously imparting longitudinal movements thereto.

A still further object of my invention is to provide a novel apparatus for guiding a window glass having an inclined edge, in up and down movements.

Further objects and advantages will become apparent throughout a reading of the following detailed description and accompanying drawing, in which—

Fig. 1 is an inner side elevation of a vehicle body door having a trapezoidal window opening and embodying the improvements of my invention, parts being broken away to illustrate the working details more clearly.

Fig. 2 is a side elevation of a door similar to that illustrated in Fig. 1 and having a similar window opening and embodying a modified form of my invention, parts being broken away to illustrate certain details.

Fig. 3 is an enlarged cross-sectional detail view taken on the line 3—3 of Fig. 1 and looking in the direction indicated by the arrows.

Fig. 4 is an enlarged cross-sectional detail view taken on the line 4—4 of Fig. 3 looking in the direction indicated by the arrows.

Fig. 5 is an enlarged cross-sectional view of the guide member taken on the line 5—5 of Fig. 3.

Fig. 6 is an enlarged detail view of the rear glass run channel taken on the line 6—6 of Fig. 1; and Fig. 7 is an enlarged detail view of the lower glass channel stop taken on the line 7—7 of Fig. 1.

Referring now to the drawing in detail, in which like numerals designate like parts throughout the several views, the numeral 10 designates the door of an automotive vehicle, the upper forward edge 11 of which is inclined at an angle, the rear edge 12 being vertically disposed. A window opening 13 of trapezoidal shape with the front edges inclined is provided in the upper part of the door and a plate glass window 14 is provided of the same shape having its forward edge inclined at an angle substantially parallel to the inclined forward edge of the window opening 13.

The bottom edge of the glass is bound by a weatherstrip 15 of rubber or other suitable material which is clamped in a metal frame 16 embracing its edges (Fig. 3). The frame 16 is fixedly mounted on a longitudinally disposed metal cross piece 17 extending across the door between the outer and inner panels thereof and is movable therebetween. The piece 17 has a pair of axially aligned longitudinally disposed slots 18 therein, one spaced forwardly and one rearwardly of the center line of the piece.

A pair of levers 19 are rotatably mounted on and associated with suitable gear elements (not shown in the drawing) which are enclosed in the gear housing 20 fixed in the door 10. A suitable hand crank 21 is associated with the gearing which propels the levers 19. The levers are adapted to be rotated outwardly away from each other upon rotation of the hand crank 21 and associated gearing in one direction, and are adapted to be raised toward each other when the crank is rotated in the opposite direction. The mechanism enclosed in the housing 20 for rotating the levers 19 in opposite directions is well known in the art and any suitable arrangement may be employed.

The upper ends of the levers 19 are provided with round pins 22 which extend through the slots 18 of the cross piece 17 and are adapted to slide therein and be guided in cam fashion. Rollers may be employed in place of pins 22 if desired and the ends of the pins 22 may be suitably keyed against removal from the slot 18 if deemed necessary.

As the levers 19 are rotated outwardly in opposite directions away from each other, the pins 22 will be moved outwardly in the slots 18 and, due to the arcuate path through which they are rotated, they will exert a cam action against the cross piece 17 and lower it as indicated by the dotted lines in Fig. 1. The window glass 14 may thus be lowered to a point where the top of the glass is slightly below the lower side of the window frame.

In sliding a glass of trapezoidal shape in a window opening of like shape, particularly where the forward side edge thereof is inclined at an angle to the perpendicular, by the method of my invention the glass will definitely be guided in its up and down movement through a definite angular path. This action is accomplished by providing a rear glass run channel 24 which is mounted on the rear upright of the door frame in any suitable manner, the one illustrated in Fig. 1 being held in an inclined position by a bracket 25. The glass run channel 24 is mounted at an angle complementary to that of the forward edge of the glass 14 and window opening 13 and is parallel thereto. As illustrated in Fig. 6, this channel includes a metal frame member lined with an insulating strip 26 of rubber, felt or other suitable material. The rear edge of the glass is adapted to slide up and down in this channel when raised or lowered. A channel stop 27 of rubber, felt or other material is mounted on the door 10 on a frame member 28 thereof and is disposed in alignment with the lower edge of the glass plate 14 to receive it, as illustrated in Fig. 7, and act as a stop to protect the glass when the window is completely lowered.

A metal guide member 30 is provided to guide the up and down movements of the glass through a definitely inclined path parallel to the inclined forward edge of the window frame, or through a path inclined at a greater or lesser angle which is suitable to accomplish the objects set forth of keeping the forward edge of the glass covered by the inclined forward edge of the window frame when raised and lowered. The member 30 has a U-shaped center channel 31 formed therein extending substantially throughout the length of the member intermediate its side edges as clearly illustrated in Fig. 5. A round stud 32 is fixed in the cross plate 17 by riveting or in any other suitable manner and extends inwardly into the channel 31 of the member 30, being adapted to slide therein throughout the length of the channel when the window is raised or lowered.

The guide member 30 is rigidly mounted in the center of the door 10 at an angle exactly parallel to the glass run channel 24 and the inclined forward edge of the window glass 14 and the window opening 13 as shown in the drawing, although it is to be understood that if found desirable the guide member may be set at any greater or lesser angle than the inclined forward edge of the opening and glass which will keep the forward edge of the glass covered as it is lowered.

Screws 33 are employed to secure the guide member to the door frame at its lower end. A slot 34 is provided in the guide member at its upper end to receive a bolt 35 or other suitable fastening device by which it is secured to the door frame. By the employment of the slot 34 the guide member may be quickly and readily adjusted in exact parallel alignment with the rear glass run channel 24, which is necessary to insure smoothness of action and movement of the glass in the proper path. This adjustment may be accomplished by first inserting one of the screws 33, next aligning the guide member 30 which is free to move because of the slot 34, with the channel 24, then tightening the fastening device 35 and thereafter inserting the other screw 33.

In the modification illustrated in Fig. 2, the same principles and parts of my invention are employed with the exception that the guide member 30 is mounted at the rear portion of the door, close to the rear glass run channel 24, a bracket 36 being provided to secure the lower end of the guide member 24 to the frame piece 28.

It will be noted that the glass 14 extends well back of the rear edge of the window opening 13, at least a distance sufficient to allow the glass to move away from the frame 12 in its required forward movement to compensate for the angle of inclination of the forward edge of the window opening without exposing the rear edge of the glass. Suitable glass run channels may be employed at the forward and rear edges of the window opening if so desired.

The operation of the device of my invention is apparent from the foregoing detailed description of its parts. When the window is lowered by rotating the arms 19 to exert cam action on the slots 18 of the cross piece 17 the rear edge of the glass plate 14 will slide downwardly in the glass run channel 24 and be gradually moved forwardly by the guide member 30 so that the forward edge of the glass will follow the inclined frame 11 of the door 10. The rear edge of the glass will move away from the frame 12 but will remain within the edges of the window opening 13 at all times. The stud 32 operating in the channel 31 of the guide member 30 will act as a bearing to insure smooth and easy forward movement of the glass, and promote a steady movement of the glass through the same definite angular path required to maintain the forward edge of the glass within the forward edge of the window opening at all times. The glass will assume the position illustrated by the dotted lines in Fig. 1 when it is entirely lowered.

It is to be understood that my invention may be applied to any type of window opening where it is required to lower the glass through a definite angle, the showing of my invention in association with a door being merely one of the uses to which it may be put. It is also contemplated that such window opening and guiding apparatus may be used in convertible types of vehicle bodies or in any type wherein the front windshield or adjoining pillars are inclined. The employment of my invention insures the protection and covering against exposure of both side edges of the glass at all times, even when completely lowered, facilitating free and smooth action and preventing looseness and rattling.

By the employment of the guide of my invention, it is apparent that the side edges of the window glass will be free at all times due to the spacing of the guide interjacent the side edges of the glass and window opening. This guide acts as the bearing for the movements of the window glass and restricts these movements to a path suitably inclined to the vertical to keep the glass within the side edges of the irregularly shaped window opening at all times. If desired, the lower rear glass run channel may be omitted and it is also contemplated that two or more guides may be mounted below the window opening interjacent its edges in parallel relation to each other if found advisable to more rigidly support the window, as for example, in wider window openings. Numerous advantages arise through the elimination of side glass channels about the side edges of the glass adjacent the window opening.

My invention makes possible the elimination of edge guiding members such as the channels that are conventionally used to receive and provide a guiding bearing for the side edges of the window glass, and the attendant difficulties of adjusting the channels at opposite edges of the glass in parallel relation and the susceptibility to binding and hindering movement of the glass in the event it should work loose enough to rock slightly in its own plane. It also provides means for easily adjusting the angle of movement of the glass, as the guide member or members 30 are readily accessible upon removal of the inner door panel.

I claim:

1. In an automotive vehicle door, the upper portion of which is provided with a trapezoidal window opening and a movable window of like configuration, a front edge of said opening and a front edge of said window being similarly inclined, means for guiding said window during lowering, to maintain said edge concealed in all positions including an elongated channeled guide member fixed in the door at an angle to the rear window edge and parallel to the inclined front edge of the window and opening, and a projecting cam fixed on said window and in slidable engagement with the channel in the guide member.

2. In an automotive vehicle door, the upper portion of which is provided with a trapezoidal window opening and a movable window of like configuration, a front edge of said opening and a front edge of said window being similarly inclined, means for guiding said window during lowering to maintain said edge concealed in all positions including a slotted guide member fixed in said door at an angle to the rear window edge and coinciding with the inclination of the front edge of the window and opening and a slot engaging member mounted on said window at the lower edge thereof and extending into the slot of the guide member and slidable therein throughout the entire lowering movement of the glass.

3. In an automotive vehicle door, the upper portion of which is provided with a trapezoidal window opening and a movable window of like configuration, a front edge of said opening and a front edge of said window being similarly inclined, means for guiding said window during lowering to maintain said edge concealed in all positions including an elongated guide fixed in the central portion of the door below the window opening and intermediate its edges at an angle to the rear edge of the window and coinciding with that of the inclined forward edge of the window and opening, and a guide engaging member mounted at the lower edge of the window in slidable engagement with the elongated guide throughout the entire lowering movement of the window.

4. In an automotive vehicle door, the upper portion of which is provided with a trapezoidal window opening and a movable window of like configuration, a front edge of said opening and a front edge of said window being similarly inclined, means for guiding said window during lowering to maintain said edge concealed in all positions including an elongated guide fixed at the rear portion of the door below the window opening and near its rear edge at an angle to the rear window edge and coinciding with that of the inclined forward edge of the window and opening, and a cam mounted on the lower edge of the window near its rear edge in slidable engagement with the elongated guide throughout the entire lowering movement of the window.

5. In a vehicle body window construction having a window opening with an inclined front edge for a movable window glass having similarly inclined front edges, means to move said window when raised or lowered in a path coinciding with the inclined front edge of the window opening and glass, including a stationary guide channel mounted parallel to the inclined front edge of the window opening, a projecting member fixed on the window glass in continuous slidable engagement with the guide channel throughout the raising and lowering movement thereof and a second guide for one edge of the window glass disposed below the window opening, the opposite edge of said window being unguided below said opening.

6. In a vehicle body window construction having a window opening with an inclined front edge for a movable window glass having similarly inclined front edges, means to move said window when raised or lowered in a path coinciding with the inclined front edge of the window opening and glass, including a rear glass run channel which guides the rear edge of the glass disposed in the body below the rear edge of the window opening inclined at a similar angle to that of the front edge of the glass, a channeled guide fixed intermediate the edges of the window opening and glass parallel to the rear glass run channel, and a projecting member mounted on the window glass and extending into the channel of the guide to maintain slidable engagement therewith throughout the raising and lowering movements of the glass the front edge of the glass being unguided below the window opening.

7. In a vehicle body window construction having a window opening with an inclined front edge for a movable window glass having similarly inclined front edges, means to move said window when raised or lowered in a path coinciding with the inclined front edge of the window opening and glass, including a rear glass run channel adapted to guide the rear edge of the glass disposed in the body below the rear edge of the window opening inclined at a similar angle to that of the front edge of the glass, a channeled guide fixed in the vehicle body parallel to the rear glass run channel and in close proximity thereto, and a projecting member mounted on the window glass and extending into the channel of the guide to maintain slidable engagement therewith throughout the raising and lowering movements of the glass the front edge of said glass being unguided below the window opening.

8. In a vehicle body window construction having a window opening with an inclined front edge for a movable window glass having similarly inclined front edges, means to move said window when raised or lowered in a path coinciding with the inclined front edge of the window opening and glass, means for advancing said glass when lowered to maintain its forward edge within the forward edge of the window opening to be continuously covered thereby which includes an angularly adjustable metal guide mounted in the vehicle body below the window opening and inclined forwardly at an angle similar to that of the inclined forward edge of the window opening, adjusting means at one end of said guide to fix the guide at the predetermined desired angle, and a guide engaging device slidably associated with the guide and fixed to the window glass to cause said glass to be advanced along the forward edge of the window opening when lowered.

9. In a window construction having an irregularly shaped window opening and an irregularly shaped window glass movable in said opening, an angularly adjustable inclined guide for said window glass disposed below said window opening interjacent its side edges and adjusting means associated with one end of said guide to permit angular adjustment of said guide.

10. In a window construction having a window opening with an inclined forward edge and a window glass movable in said opening having a similarly inclined forward edge, and an inclined guide adjustable angularly for said window glass disposed below said window opening interjacent its side edges and adjusting means associated with one end of said guide to permit angular adjustment of said guide.

11. In combination, a window opening having an inclined forward edge, an inclined window guide disposed below said opening and interjacent its side edges, a window glass having an inclined forward edge, means on said window in slidable engagement with said guide a second guide for one edge of said glass disposed below the window opening and parallel to the first guide and means to raise and lower said window.

12. In a window construction having an irregularly shaped window opening and an irregularly shaped window glass movable in said opening, an inclined guide fixed below the window opening intermediate its side edges, a member fixed to the glass and disposed in slidable engagement with said guide and a second guide for one edge of said glass, the opposite edge of said glass being unguided below the window opening.

13. In a vehicle body door, the upper portion of which is provided with an irregularly shaped window opening, an irregularly shaped window glass movable in said opening, an inclined guide for said glass operatively associated therewith mounted in the door below the window opening interjacent its side edges and a second guide for the rear edge of said glass, the front edge being unguided below the window opening.

14. In a window construction, a window opening, a window glass movable in said opening, inclined guide means for said window glass disposed below said opening interjacent its side edges and a second guide for one edge of said glass below the window opening, the opposite edge of said glass being unguided below the window opening.

15. In a window construction, a window opening, a movable window for said opening, a guide for one edge of said window below the window opening, the opposite edge of said window being unguided below said opening, and an additional guide therebelow interadjacent said edges.

16. In a window construction, a window opening, a movable window in said opening, a window guide at one end of said window below the opening and a second guide for said window parallel with the first guide, and disposed interadjacent the edges of said window.

17. In a window construction, a window opening, a movable window in said opening, said window being provided with an edge sloping in the plane of movement of said window, a guide for the opposite edge of said window disposed parallel to the first of said edge and at an angle to said last mentioned edge, and a second guide element disposed parallel to said first guide interadjacent the window edges.

OTTO F. GRAEBNER.